under review

(12) United States Patent
Rai et al.

(10) Patent No.: US 9,258,748 B1
(45) Date of Patent: Feb. 9, 2016

(54) CIRCUIT SWITCH FALLBACK HANDLING FOR WIRELESS COMMUNICATION DEVICES IN WIRELESS COMMUNICATION NETWORKS

(71) Applicant: Sprint Communications Company L.P., Overland Park, KS (US)

(72) Inventors: Deveshkumar Narendrapratap Rai, Overland Park, KS (US); Maulik K. Shah, Overland Park, KS (US); Jasinder Pal Singh, Olathe, KS (US); Jose L. Hernandez, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 270 days.

(21) Appl. No.: 13/913,689

(22) Filed: Jun. 10, 2013

(51) Int. Cl.
*H04W 4/00* (2009.01)
*H04W 36/00* (2009.01)

(52) U.S. Cl.
CPC ................................. *H04W 36/0022* (2013.01)

(58) Field of Classification Search
CPC ....................................................... H04W 8/04
See application file for complete search history.

(56) References Cited

U.S. PATENT DOCUMENTS

| 2009/0258671 | A1* | 10/2009 | Kekki | ................. | H04W 76/027 455/552.1 |
| 2012/0028661 | A1 | 2/2012 | Fang et al. | | |
| 2012/0034910 | A1 | 2/2012 | Fang et al. | | |
| 2012/0069817 | A1* | 3/2012 | Ling | ..................... | H04W 36/14 370/331 |
| 2012/0224563 | A1* | 9/2012 | Zisimopoulos et al. | ...... | 370/331 |
| 2012/0258707 | A1* | 10/2012 | Mathias et al. | ............ | 455/426.1 |
| 2013/0235740 | A1* | 9/2013 | Kim | ...................... | H04W 24/04 370/252 |
| 2013/0329567 | A1* | 12/2013 | Mathias | ................ | H04W 36/30 370/242 |

FOREIGN PATENT DOCUMENTS

WO    WO 2014/117390    *  2/2013

* cited by examiner

*Primary Examiner* — Timothy Pham

(57) ABSTRACT

Systems, methods, and software for handling circuit switch fallback (CSFB) communications are provided herein. A method of operating a wireless communication device includes wirelessly registering with the first communication network to receive a wireless data service, and after the registration with the first communication network with an enabled CSFB configuration, wirelessly registering with a second wireless communication network to receive a wireless circuit switched voice service. The method also includes identifying a service problem with the second wireless communication network, and in response, de-registering from the first wireless communication network and disabling the CSFB configuration. The method includes, after disabling the CSFB configuration, re-registering with the first wireless communication network to receive the wireless data service. After the re-registration with the first wireless communication network, the method includes exchanging voice communications over the wireless data service of the first wireless communication network without using the CSFB services.

18 Claims, 7 Drawing Sheets

US 9,258,748 B1

CIRCUIT SWITCH FALLBACK HANDLING FOR WIRELESS COMMUNICATION DEVICES IN WIRELESS COMMUNICATION NETWORKS

TECHNICAL FIELD

Aspects of the disclosure are related to the field of wireless communications, and in particular, circuit switch fallback handling for wireless communication devices in wireless communication networks.

TECHNICAL BACKGROUND

Wireless communication systems typically include wireless access systems with equipment such as wireless access nodes along with various control and routing nodes which provide wireless access to communication services for wireless communication devices over wireless links. A typical wireless communication system includes systems to provide wireless access across a geographic region, with wireless coverage areas associated with individual wireless access nodes. The wireless access systems exchange user communications between wireless communication devices, service providers, and other end user devices. The user communications typically include voice calls, data exchange, web pages, streaming media, or text messages, among other communication services.

In some wireless communication systems, more than one wireless communication protocol or wireless frequency spectrum can be employed across more than one wireless network. For example, a first wireless network employing a first wireless communication protocol can be deployed along with a second wireless network employing a second wireless communication protocol. Separate wireless access equipment can be deployed for each wireless network, such as when a fourth generation (4G) Long Term Evolution (LTE) wireless network is deployed over a similar geographic area as a third generation (3G), legacy, or other non-LTE wireless network. Wireless communication devices can be configured to support multiple wireless access modes, such as communicating with one or more wireless networks.

Voice services or overhead signaling for the voice services of legacy wireless networks can be provided over other non-legacy wireless communication networks. In some examples, circuit switched fallback (CSFB) techniques are employed to carry overhead signaling for voice communications of a legacy wireless communication network over the overhead signaling or data services of another wireless communication network.

Overview

Systems, methods, and software for handling circuit switch fallback communications in wireless communication networks are provided herein. In one example, method of operating a wireless communication device that is initially configured to use circuit switch fallback (CSFB) services over a first wireless communication network is provided. The method includes wirelessly registering with the first communication network to receive a wireless data service, and after the registration with the first communication network and responsive to an enabled CSFB configuration, wirelessly registering with a second wireless communication network to receive a wireless circuit switched voice service. The method also includes identifying a service problem with the second wireless communication network, and in response, de-registering from the first wireless communication network and disabling the CSFB configuration. The method includes, after disabling the CSFB configuration, re-registering with the first wireless communication network to receive the wireless data service. After the re-registration with the first wireless communication network, the method includes exchanging voice communications over the wireless data service of the first wireless communication network without using the CSFB services.

In another example, wireless communication device that is initially configured to use circuit switch fallback (CSFB) services over a first wireless communication network is provided. The wireless communication device includes a transceiver portion configured to wirelessly register with the first communication network to receive a wireless data service. After the registration with the first communication network and responsive to an enabled CSFB configuration, the transceiver portion is configured to wirelessly register with a second wireless communication network to receive a wireless circuit switched voice service. The wireless communication device also includes a processing system configured to identify a service problem with the second wireless communication network, and in response, de-register from the first wireless communication network and disable the CSFB configuration. After disabling the CSFB configuration, the transceiver portion is configured to re-register with the first wireless communication network to receive the wireless data service. After the re-registration with the first wireless communication network, the transceiver portion is configured to exchange voice communications over the wireless data service of the first wireless communication network without using the CSFB services.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
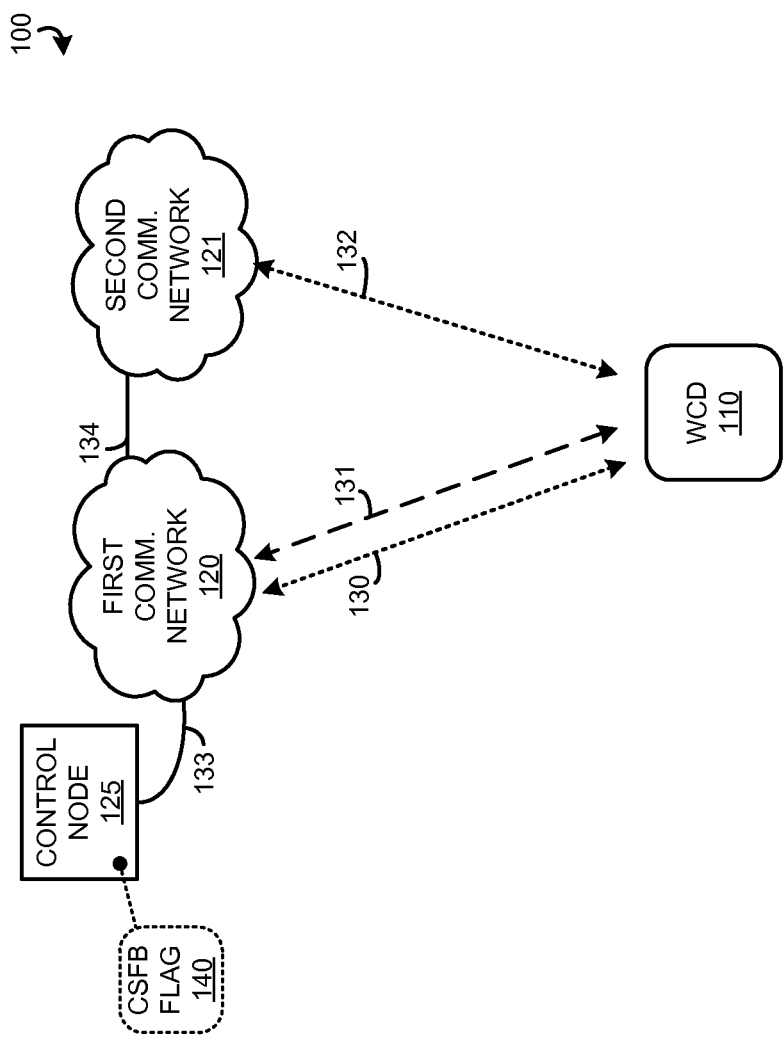
FIG. 1 is a system diagram illustrating a communication system.

FIG. 1 is a system diagram illustrating communication system 100. Communication system 100 includes wireless communication device 110, first wireless communication network 120, second wireless communication network 121, and control node 125. First wireless communication network 120 and control node 125 communicate over link 133. Wireless communication device (WCD) 110 can communicate with first wireless communication network 120 over wireless links 130-131, and can communicate with second wireless communication network 121 over wireless link 132. First wireless communication network 120 and second wireless communication network 121 communicate over link 134.

Wireless communication device 110 can receive wireless access to communication services over any of links 130-132. The communication services can include voice calls, data exchange, web pages, streaming media, or text messages, among other communication services. In FIG. 1, two wireless links 130-131 are shown in FIG. 1 to illustrate the difference in CSFB services provided to WCD 110 over each link. It should be understood that a single wireless link could be indicated in FIG. 1 which represents all wireless communications between WCD 110 and first wireless communication network 120.

Figure 2:
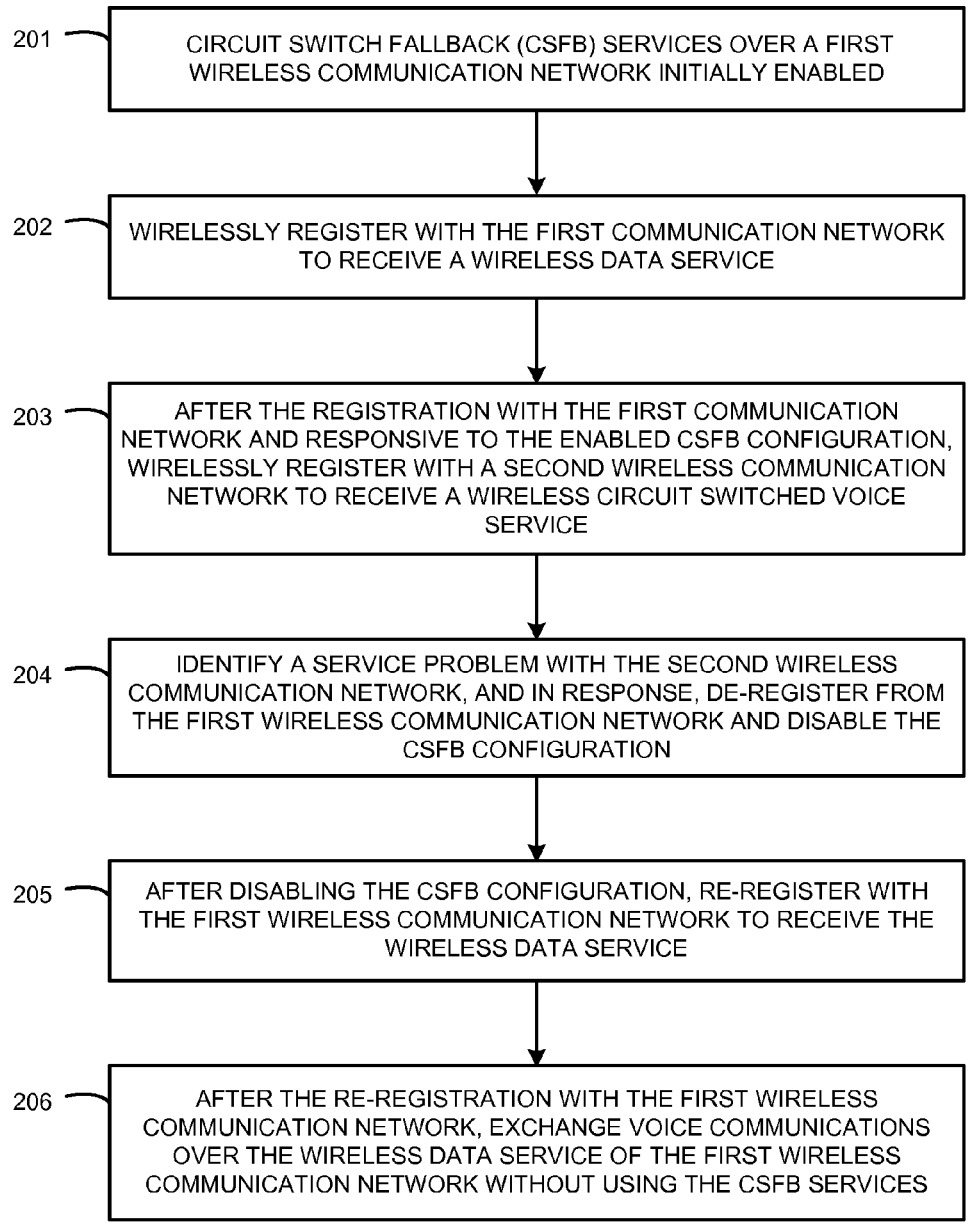
FIG. 2 is a flow diagram illustrating a method of operation of a wireless communication device.

FIG. 2 illustrates a flow diagram which describes an example method of operation of a wireless communication device, such as for wireless communication device 110 of FIG. 1. The operations of FIG. 2 are referenced parenthetically in the description below.

In FIG. 2, circuit switch fallback (CSFB) services over first wireless communication network 120 are initially enabled (201) by WCD 110. In this example, CSFB services can be provided by first wireless communication network 120 over wireless link 130. CSFB services include the transport of at least overhead or control signaling for voice call services of a legacy wireless communication network over wireless communications of another wireless communication network. In FIG. 1, first wireless communication network 120 provides CSFB services which handle at least overhead or control signaling for voice services of second wireless communication network 121. The overhead or control signaling can include call paging signaling, circuit switched voice call signaling, and text message signaling. Other types of overhead or control signaling can be carried over CSFB signaling pathways of wireless link 130. CSFB signaling can be also exchanged over link 134 between first wireless communication network 120 and second wireless communication network 121.

Initially, the CSFB services are enabled by a CSFB configuration that indicates CSFB services are to be used by WCD 110. The CSFB configuration can be stored in control node 125 as CSFB flag 140, although variations are possible. WCD 110 can indicate to control node 125 over first wireless communication network 120 that the CSFB configuration is to be enabled, such as via control messaging over link 130 during a registration process with first wireless communication network 120, such as in operation 202.

WCD 110 also wirelessly registers (202) with first wireless communication network 120 to receive a wireless data service. The wireless data service can include a cellular data service, such as provided over wireless link 130, and can include various registration and handshaking to establish wireless link 130. The CSFB configuration is typically indicated as enabled by WCD 110 during this registration process, unless already enabled via a default or initial configuration in control node 125.

After the registration with first wireless communication network 120 and responsive to the enabled CSFB configuration, WCD 110 wirelessly registers (203) with second wireless communication network 121 to receive a wireless circuit switched voice service. The wireless circuit switched voice service can include a cellular circuit switched voice service, such as provided over wireless link 132, and can include various registration and handshaking to establish wireless link 132. WCD 110 can tune away temporarily from first wireless communication network 120 to a frequency band, spectrum, or channel associated with second wireless communication network 121 in order to register for the wireless circuit switched voice service over second wireless communication network 121.

In this example, the CSFB configuration is enabled and various control or overhead signaling for establishing the wireless circuit switched voice service can be received over CSFB signaling portions of wireless link 130 from first wireless communication network 120. Thus, a portion of the registration process with second wireless communication network 121 can occur over CSFB signaling provided by first wireless communication network 120. Elements of second wireless communication network 121 and first wireless communication network 120 can be communicatively coupled to provide the CSFB signaling over link 134. In some examples, WCD 110 registers with second wireless communication network 121 responsive to paging information provided over a portion of wireless link 130, such as over CSFB signaling portions indicating an incoming voice call, text message, or other alert or communication session to be established over second wireless communication network 121.

WCD 110 identifies (204) a service problem with second wireless communication network 121, and in response, de-registers from first wireless communication network 120 and disables the CSFB configuration. The service problem with second wireless communication network 121 can include detecting one or more failed voice calls over the wireless circuit switched voice service of second wireless communication network 121. The service problem with second wireless communication network 121 can include detecting unavailability of second wireless communication network 121. Other service problems can be identified, such as poor wireless signal quality of pilot or beacon signals of second wireless communication network 121, inability to establish wireless link 132, one or more dropped calls over wireless link 132, or other network or wireless communication failures or faults.

Responsive to the service problem, WCD 110 de-registers from first wireless communication network 120. This de-registration can include tear down signaling or de-registration signaling over wireless link 130. This de-registration can also include first returning to communicating over first wireless communication network 120, after initially tuning away in operation 203, and then indicating de-registration signaling to first wireless communication network 120. De-registration can include tuning away from first wireless communication network 120 or disabling a transceiver portion of WCD 110 associated with first wireless communication network 120.

Also, disabling the CSFB configuration can include indicating a disabled flag or indicator in WCD 110, which can be later communicated to control node 125. The disabling of the CSFB configuration in WCD 110 can occur before or during the de-registration process of operation 204, or can occur after re-registration, such as in operation 205 below.

After disabling the CSFB configuration, WCD 110 re-registers (205) with first wireless communication network 120 to receive the wireless data service. The re-registration process can include a registration process over wireless link 131 or a registration process to establish wireless link 131. Beacon or pilot signals of first wireless communication network 120 can be monitored by WCD 110 to establish the wireless data service over wireless link 131. The wireless data service can include a cellular data service, such as provided over wireless link 131, and can include various registration and handshaking to establish wireless link 131. The CSFB configuration can be indicated as disabled to control node 125 by WCD 110 during this registration process, unless already indicated during a de-registration process of operation 204.

After the re-registration with first wireless communication network 120, WCD 110 exchanges (206) voice communications over the wireless data service of first wireless communication network 120 without using the CSFB services. In this example, wireless link 131 is shown to indicate a communication pathway between WCD 110 and first wireless communication network without the CSFB services.

Exchanging the voice communications over the wireless data service of first wireless communication network 120 without using the CSFB services can include exchanging the voice communications using a voice over packet (VoP) user application on WCD 110, such as Skype, Fring, or another user application. The VoP application can include a voice over Internet protocol (VoIP) or voice over LTE (VoLTE) application or software service of WCD 110.

Prior to exchanging user voice communications over the wireless data service, WCD 110 can test a voice quality check using the wireless data service and exchange the voice communications using the VoP user application when the voice quality check indicates a voice quality exceeding a voice quality threshold. The voice quality check can include any number of voice quality checks, such as tone testing, loopback testing, bandwidth checking, latency checks, or other link or voice quality testing. The voice quality threshold can indicate a minimum quality before voice communications can be established, such as a minimum link bandwidth, a minimum audio quality, maximum latency, or other thresholds.

Figure 3:
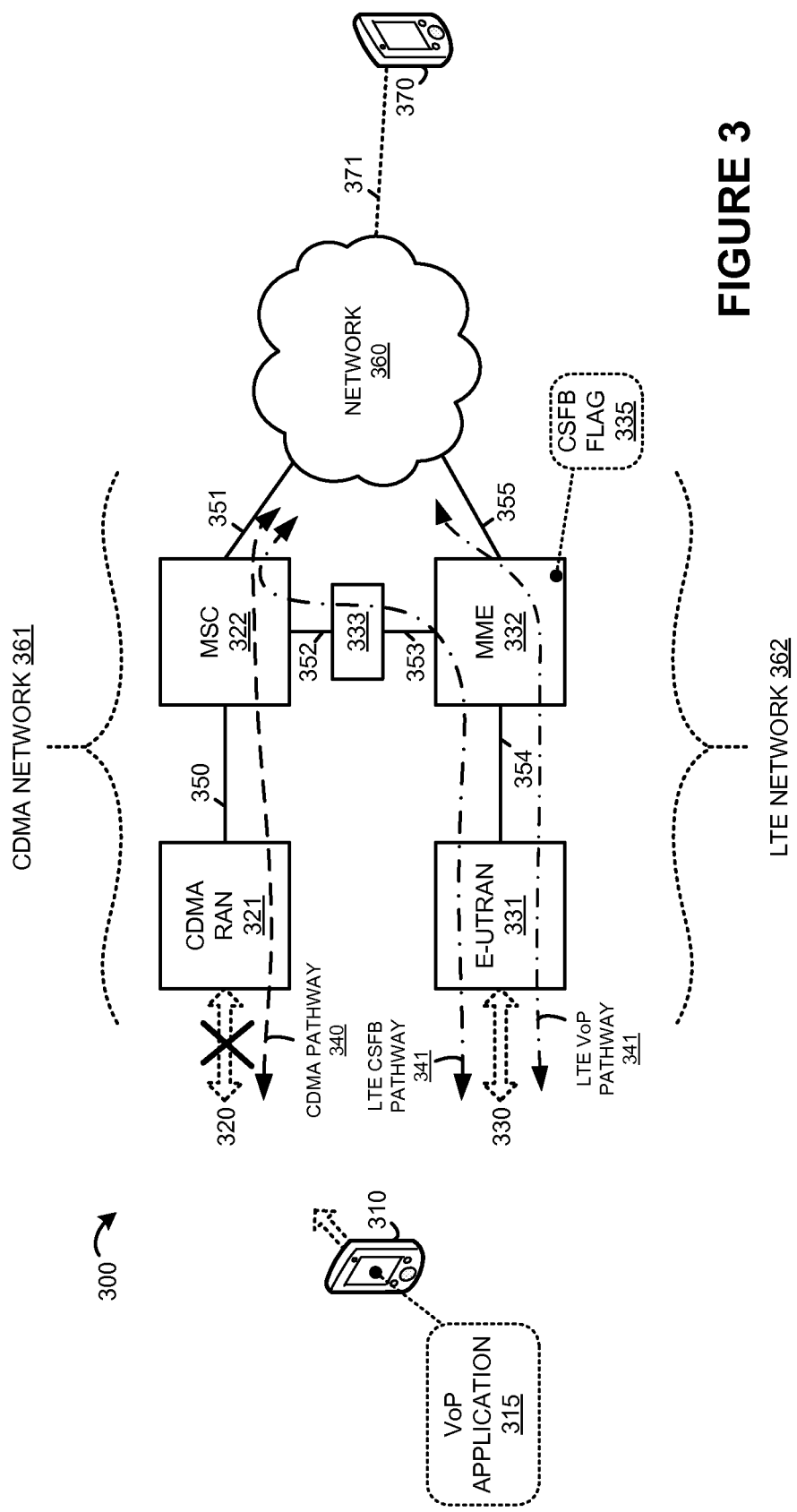
FIG. 3 is a system diagram illustrating a communication system.

FIG. 3 is a system diagram illustrating communication system 300. Communication system 300 includes user devices 310 and 370, Code Division Multiple Access (CDMA) radio access network (RAN) 321, mobile switching center (MSC) 322, Evolved Universal Terrestrial Radio Access network (E-UTRAN) 331, Mobility Management Entity (MME) 332, interworking function (IWF) node 333, and network 360.

User device 310 comprises an end user device, such as a smartphone or feature phone in this example and can communicate with any of CDMA RAN 321 and E-UTRAN 331 over the associated wireless links. User device 370 comprises an end user device, which can include devices as discussed for user device 310, or can include other wireless or wired communication devices. User device 370 communicates with at least network 360 over link 371. CDMA RAN 321 and MSC 322 communicate over link 350, which is a network link in this example. MSC 322 and core network 360 communicate over link 351, which is an optical network link in this example. E-UTRAN 331 and MME 332 communicate over backhaul link 354, which is a network link in this example. MME 332 and core network 360 communicate over link 255, which is an optical network link in this example. IWF 333 and MSC 322 communicate over packet network link 352. IWF 333 and MME 332 communicate over packet network link 353.

Elements 321, 322, 331, 332, 333, and 360 can comprise a communication network or multiple communication networks such as first wireless communication network 120 or second wireless communication network 121 found in FIG. 1, although variations are possible. In operation, elements 321, 322, 331, 332, 333, and 360 provide wireless access to communication services for at least user device 310.

CDMA RAN 321 includes radio access equipment of a CDMA communication system, and includes CDMA (e.g. non-LTE) signaling pathway 340 in this example comprising wireless link 320, links 350-351, and associated equipment. CDMA RAN 321 can include base stations, wireless access nodes, routers, switches, as well as RF communication circuitry including antennas, amplifiers, filters, RF modulators, transceivers, and signal processing circuitry.

E-UTRAN 331 includes radio access equipment of an LTE communication system, and includes LTE signaling pathway 341 in this example comprising wireless link 330, links 354-355, and associated equipment. E-UTRAN 331 can include base stations, wireless access nodes, routers, switches, as well as RF communication circuitry including antennas, amplifiers, filters, RF modulators, transceivers, and signal processing circuitry.

IWF 333 comprises systems and equipment for transferring at least overhead and control communications between LTE and non-LTE pathways, among other operations. IWF 333 can include communication or network interfaces, as well as computer systems, microprocessors, circuitry, or some other processing devices or software systems, and can be distributed among multiple processing devices. Examples of IWF 333 can also include software such as an operating system, logs, databases, utilities, drivers, networking software, and other software stored on a computer-readable medium. IWF 333 can also include CSFB systems, Call Session Control Function (CSCF) equipment, session initiation protocol (SIP) proxy systems, SIP routing systems, SIP monitoring systems, cloud-based systems, database systems, or other systems.

An LTE S102 signaling pathway is employed in some LTE systems to ensure delivery of paging information as well as other CSFB overhead signaling from a non-LTE communication network using a non-LTE communication protocol, such as for CDMA legacy systems. For example, call paging information indicating incoming calls from core network 360 can be transferred over the LTE signaling pathway 341 for receipt by one or more user devices. The voice call itself occurs over the non-LTE signaling pathway, namely CDMA pathway 340, which can include a 1xRTT communication mode or link for handling of voice calls. Thus, a user device communicating primarily over LTE signaling pathway 341 and receiving wireless access via LTE wireless link 330 can still receive incoming CDMA voice call alerts via the call paging information transported over the S102 interface. Once the call paging information indicates an incoming call, then an affected user device can initiate further signaling to establish the voice call over CDMA pathway 340 using CDMA wireless link 340. However, in many cases, transporting the non-LTE overhead signaling using the S102 signaling pathway can lead to failed communications over the CDMA network when the CDMA wireless links or network elements are unavailable or experiencing poor signal quality.

Network 360 comprises voice and data communication and control systems for providing access to communication services for user devices and routing communications between network 360 and other voice and data networks. In some examples, network 360 includes equipment to provide wireless access to communication services within different coverage areas to user devices, route communications between content providers and user devices, and facilitate handoffs between equipment of different coverage areas, among other operations. Network 360 can also comprise further elements such as radio access network (RAN) equipment, E-UTRAN Node B equipment, eNodeB equipment, Evolved Node B equipment, Mobility Management Entity (MME) equipment, interworking functions (IWF), Home Subscriber Servers (HSS), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment. Network 360 can include LTE and CDMA networks and systems, among other types of cellular communication networks.

Figure 4:
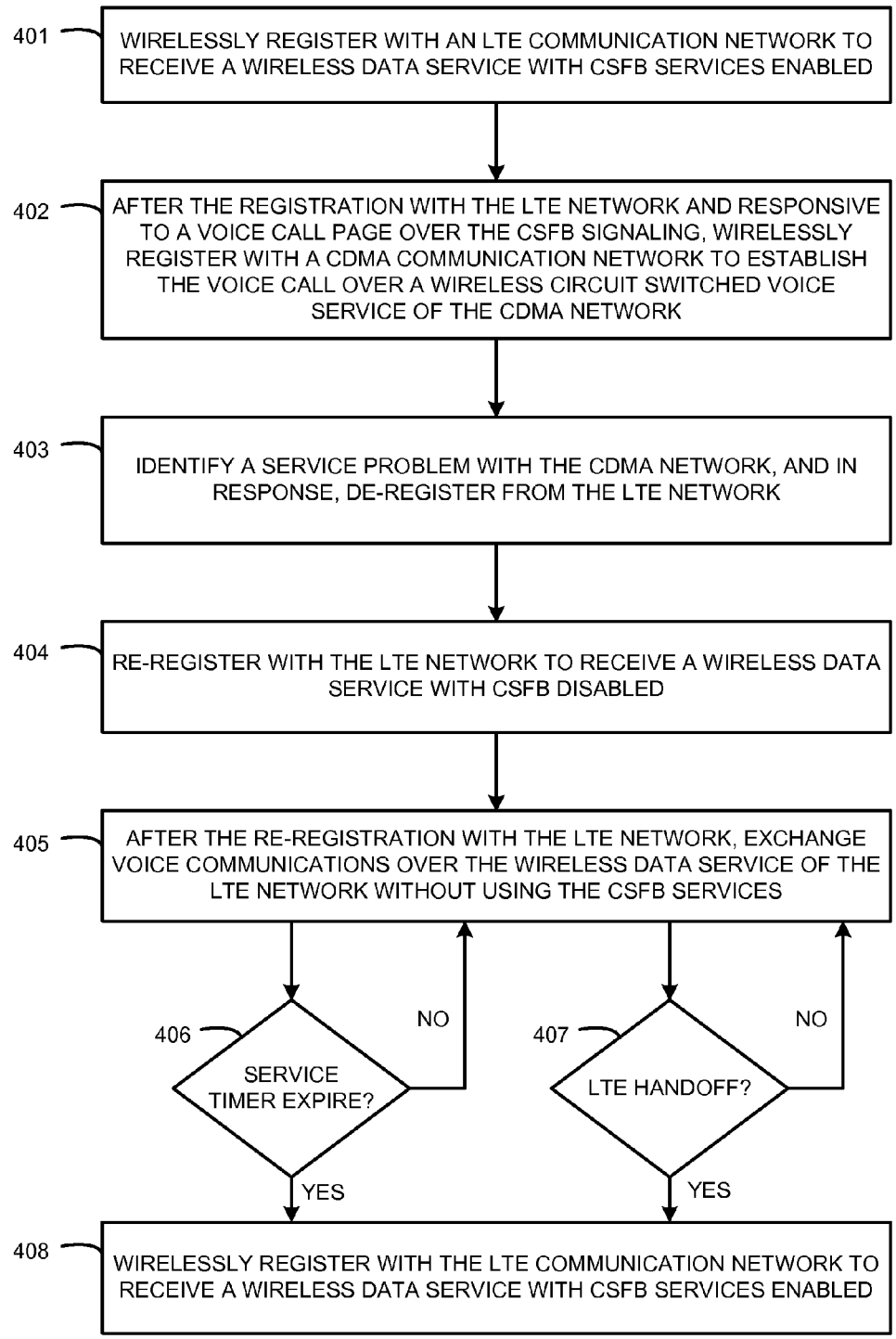
FIG. 4 is a flow diagram illustrating a method of operation of a communication system.

FIG. 4 illustrates a flow diagram which describes an example method of operation of a communication system, such as for communication system 300 of FIG. 3. The operations of FIG. 4 are referenced parenthetically in the description below.

User device 310 wirelessly registers (401) with LTE network 362 to receive a wireless data service with CSFB services enabled. In this example, LTE network 362 includes at least E-UTRAN 331, MME 332, IWF 333, and portions of network 360. The wireless data service is established over LTE wireless link 330, which is provided by E-UTRAN 331 after successful registration with at least MME 332. User device 310 indicates to MME 332 that CSFB services are enabled or allowed for user device 310, and responsively MME 332 sets CSFB flag 335 as enabled. The LTE wireless data services can include data exchange, overhead and control communications, streaming media, and the like.

After the registration with LTE network 362 and responsive to a voice call page over the CSFB signaling, user device 310 wirelessly registers (402) with CDMA network 361 to establish the voice call over a wireless circuit switched voice service of CDMA network 361. The voice call page can be issued by MSC 322 in response to an incoming voice call for user device 310 originated by user device 370. In some examples, the registration with CDMA network 361 can occur over the CSFB signaling on LTE network 362. In other examples, user device 310 can tune away temporarily from LTE wireless link 330 to a frequency band, spectrum, or channel associated with CDMA wireless link 320 in order to register for the wireless circuit switched voice service over CDMA network 361.

CDMA network 361 can include at least CDMA RAN 321, MSC 322, links 350-351, and portions of network 360. In this example, the CSFB signaling includes control or overhead signaling, such as voice call indicators, voice call pages, channel assignments, resource assignments, or other control overhead information. MSC 322 can indicate the voice call page over control or overhead signaling over IWF 333 to MME 332. MME 332 can include the voice call page indication in CSFB signaling in portions of the LTE signaling, such as indicated by LTE CSFB signaling pathway 341.

In some examples, an LTE S102 signaling pathway is employed. The LTE S102 signaling pathway can include at least LTE CSFB signaling pathway 341, IWF 333, and links 352-353. E-UTRAN 331 transfers CDMA overhead signaling for establishing a voice call to user device 310 over LTE wireless link 330. The overhead signaling includes CSFB signaling of at least one of call paging signaling, circuit switched voice call signaling, and text message signaling. Other types of CDMA overhead signaling can be carried over the LTE S102 signaling pathway.

User device 310 identifies (403) a service problem with CDMA network 361, and in response, de-registers from the LTE network. The service problem with CDMA network 361 can include inability to establish a voice call with user device 370 for the voice call page indicated over the CSFB signaling in operation 402. The service problem can include detecting one or more failed voice calls over the wireless circuit switched voice service of CDMA network 361, such as over CDMA link 320. The service problem with CDMA network 361 can include detecting unavailability of CDMA network 361 or CDMA wireless link 320. The service problem can include failure to register with CDMA network 361, such a failure in operation 402 above, or other registration failures, including missing registration parameters. Other service problems can be identified, such as poor wireless signal quality of pilot or beacon signals of CDMA RAN 321, inability to establish CDMA wireless link 320, one or more dropped calls over CDMA wireless link 320, or other network or wireless communication failures or faults.

Responsive to the service problem, user device 310 de-registers from LTE network 362. This de-registration can include tear down signaling or de-registration signaling over LTE wireless link 330. This de-registration can also include first returning to communicating over LTE network 362, after initially tuning away in operation 402, and then indicating de-registration signaling to E-UTRAN 331 or MME 332 of LTE network 362. De-registration can include further tuning away from LTE wireless link 330 or disabling a transceiver portion of user device 310 associated with LTE wireless link 330.

User device 310 re-registers (404) with LTE network 362 to receive a wireless data service with CSFB disabled. The re-registration process can include a registration process over LTE wireless link 330 or a registration process to establish LTE wireless link 330. Beacon or pilot signals of at least E-UTRAN 331 can be monitored by user device 310 to establish the wireless data service over LTE wireless link 330 or to establish LTE wireless link 330. The wireless data service can include a cellular data service, such as provided over LTE wireless link 330, and can include various registration and handshaking to establish LTE wireless link 330. The CSFB configuration is indicated as disabled by user device 310 during this registration process, unless already indicated during a de-registration process. Disabling the CSFB configuration can include first indicating a disabled flag or indicator in user device 310, which can then be communicated to MME 332 and responsively set as CSFB flag 335. The disabling of the CSFB configuration can occur before or during the re-registration process of operation 404.

After the re-registration with LTE network 362, user device 310 exchanges (405) voice communications over the wireless data service of LTE network 362 without using the CSFB services. In this example, LTE VoP pathway 341 is shown to indicate a communication pathway between user device 310 and user device 370 without the CSFB services. Exchanging the voice communications over the wireless data service of LTE network 362 without using the CSFB services can include exchanging the voice communications using a voice over packet (VoP) user application 315 on user device, such as Skype, Fring, or another user application. VoP application 315 can include a voice over Internet protocol (VoIP) or voice over LTE (VoLTE) application or software service of user device 310.

Prior to exchanging user voice communications over the wireless data service in operation 405, user device 310 can test a voice quality check using the wireless data service and exchange the voice communications using VoP user application 315 when the voice quality check indicates a voice quality exceeding a voice quality threshold. The voice quality check can include any number of voice quality checks, such as tone testing, loopback testing, bandwidth checking, latency checks, or other link or voice quality testing. The voice quality threshold can indicate a minimum quality before voice communications can be established, such as a minimum link bandwidth, a minimum audio quality, maximum latency, or other thresholds.

User device 310 can maintain a service timer, such as a countdown timer after the re-registration with LTE network 362. When the service timer expires (406), if service quality of CDMA network 361 exceeds a quality threshold, user device 310 enables the CSFB configuration with LTE network 362. The service quality of CDMA network 361 can be checked by temporarily tuning away from LTE wireless link 330 to check for signal quality of beacon or pilot signals of CDMA network 361, such as for quality of CDMA RAN 321. After checking for CDMA signal quality, user device 310 can re-tune to LTE wireless link 330, de-register from LTE network 362, and re-register for LTE network 362 with the CSFB configuration enabled in MME 332. Future voice calls can then be indicating over LTE CSFB pathway 341 and voice communications established over CDMA pathway 340 of CDMA network 361. If the service timer does not expire or if the CDMA service quality does not exceed the quality threshold, then user device 310 can continue to receive wireless data service and VoP service over LTE network 362 with CSFB signaling disabled in MME 332.

After the re-registration with LTE network 362, and in parallel or in addition to the service timer of operation 406, user device 310 can monitor for LTE handoff (407). A handoff process within LTE network 362 can include transfer of wireless access from E-UTRAN 331 to another E-UTRAN of LTE network 362. The handoff process can also include an opportunity to re-register for various services with LTE network 362, and thus user device 310 can indicate an enabled CSFB configuration to MME 332. As with the service timer, a quality check of CDMA network 361 can be performed before enabling the CSFB configuration. If a handoff process does not occur or if the CDMA service quality does not exceed the quality threshold, then user device 310 can continue to receive wireless data service and VoP service over LTE network 362 with CSFB signaling disabled in MME 332.

The examples above for FIGS. 3 and 4 (as well as below for FIG. 5) discuss CDMA networks and CSFB signaling providing control or overhead signaling for CDMA networks over LTE signaling. It should be understood that GSM, UMTS, or other legacy communication signaling can instead be provided over the CSFB signaling discussed herein.

Figure 5:
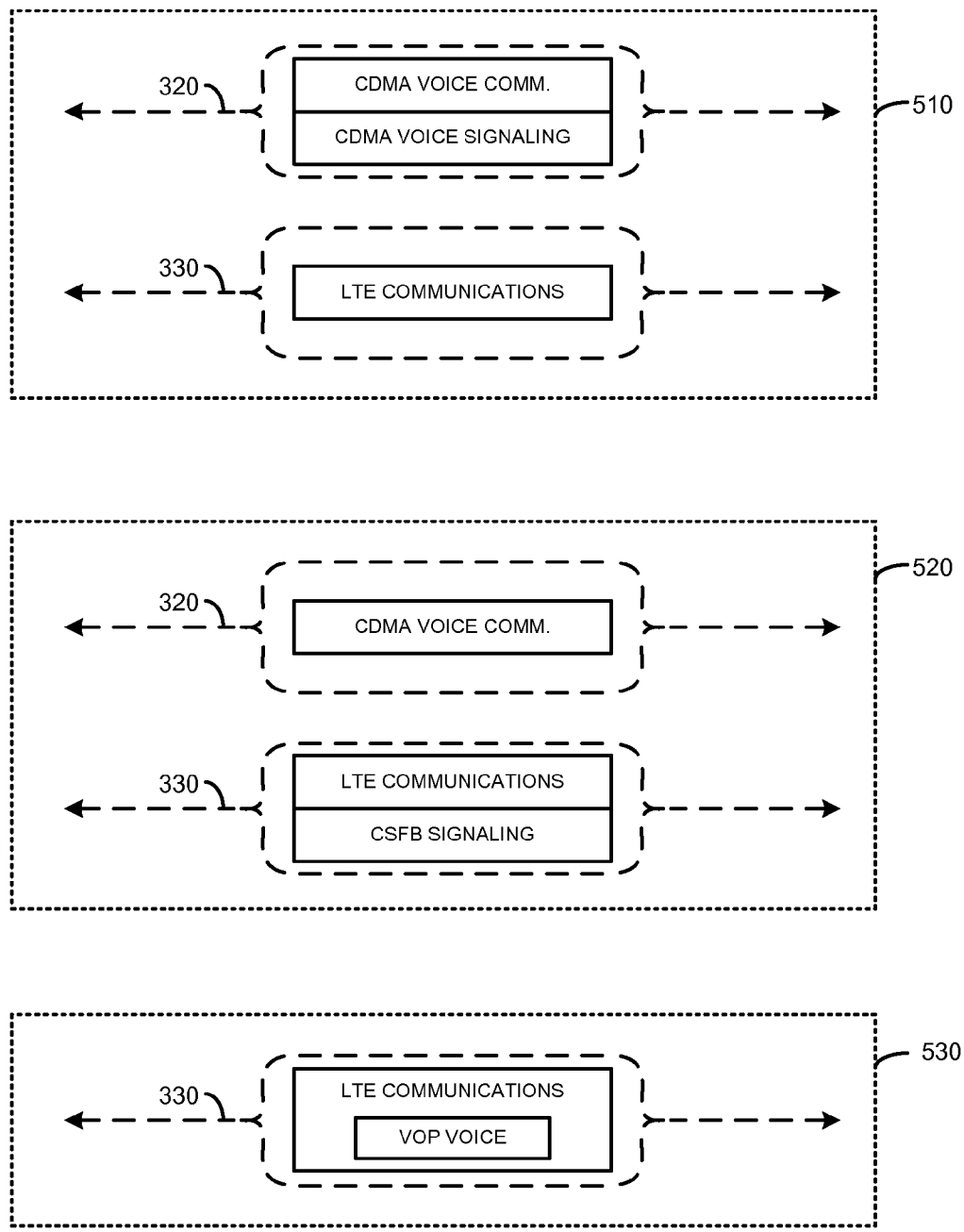
FIG. 5 includes graphs illustrating example signaling pathways.

As a further example of the various signaling pathways associated with FIG. 3, FIG. 5 is provided. FIG. 5 indicates three different signaling regimes. A first signaling regime 510 indicates a conventional signal pathway with separate signaling for CDMA communication services and LTE communication services. Regime 510 can be an example of CDMA pathway 340 in FIG. 3 along with a conventional LTE pathway over LTE link 330. CDMA voice communications and CDMA voice signaling are both provided over CDMA link 320. LTE communications, such as data services, are provided over LTE link 330.

A second regime 520 indicates an enabled CSFB signal regime, where CDMA voice communications are provided over CDMA link 320 and LTE communications include CSFB signaling in LTE link 330. The second regime 520 can be an example of LTE CSFB signaling pathway 341 in FIG. 3 combined with voice communications over CDMA link 320.

A third signaling method 520 indicates a disabled CSFB regime, where no CDMA services are provided, and VoP communications are included in LTE communications of LTE link 330. The third regime 330 can be an example of LTE VoP pathway 341, with no CDMA link employed for voice communications.

Figure 6:
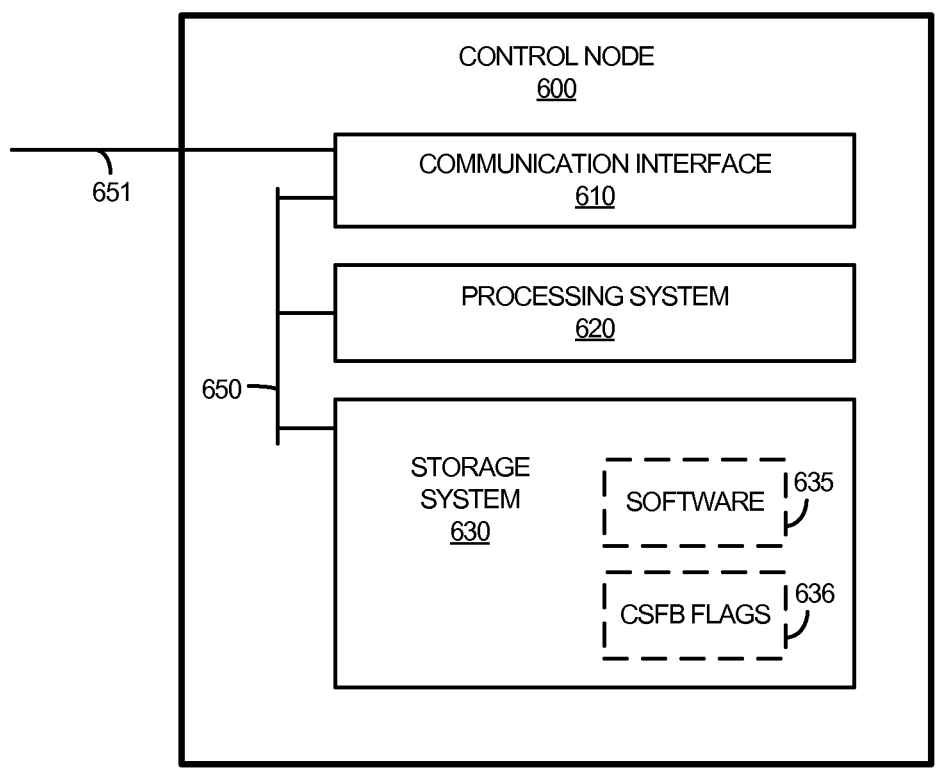
FIG. 6 is a block diagram illustrating a control node.

FIG. 6 is a block diagram illustrating a detailed view of control node 600. Control node 600 can include equipment and systems as discussed herein for control node 125 in FIG. 1, or MME 332 of FIG. 3, although variations are possible. Control node 600 includes communication interface 610, processing system 620, and storage system 630. In operation, processing system 620 is operatively linked to communication interface 610 and storage system 630 by bus 650. It should be understood that discrete links can be employed, such as network links or other circuitry. Control node 600 can be distributed or consolidated among equipment or circuitry that together forms the elements of control node 600. Control node 600 can optionally include additional devices, features, or functionality not discussed here for purposes of brevity.

Communication interface 610 includes a network interface for communicating with communication networks, such as first wireless communication network 120 of FIG. 1 or various elements of FIG. 3. The network interface can include a T1 interface, or local or wide area network communication interfaces which can communicate over an Ethernet or Internet protocol (IP) link. Examples of communication interface 610 include network interface card equipment, transceivers, modems, and other communication circuitry. In this example, communication interface 610 communicates over link 651. Link 651 can include any communication link as described herein, such as that described for links 133-134 in FIG. 1 or links 353-355 in FIG. 3.

Processing system 620 can comprise one or more microprocessors and other circuitry that retrieves and executes software 635 from storage system 630. Processing system 620 can be implemented within a single processing device but can also be distributed across multiple processing devices or sub-systems that cooperate in executing program instructions. Examples of processing system 620 include general purpose central processing units, application specific processors, and logic devices, as well as any other type of processing device, combinations, or variations thereof.

Storage system 630 can comprise any computer readable storage media readable by processing system 620 and capable of storing software 635. Storage system 630 can include volatile and nonvolatile, removable and non-removable media implemented in any method or technology for storage of information, such as computer readable instructions, data structures, program modules, or other data. In addition to storage media, in some implementations storage system 630 can also include communication media over which software 635 can be communicated. Storage system 630 can be implemented as a single storage device but can also be implemented across multiple storage devices or sub-systems co-located or distributed relative to each other. Storage system 630 can comprise additional elements, such as a controller, capable of communicating with processing system 620. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 635 can be implemented in program instructions and among other functions can, when executed by control node 600 in general or processing system 620 in particular, direct control node 600 or processing system 620 to track and register wireless communication devices, provide paging services to wireless communication devices, authenticating wireless communication devices, store circuit switched fallback (CSFB) service enable or disable indicators, and receive CSFB enable/disable indicators transferred by wireless communication devices, among other operations. Software 635 can include additional processes, programs, or components, such as operating system software, database software, or application software. Software 635 can also comprise firmware or some other form of machine-readable processing instructions executable by processing system 620.

In at least one implementation, the program instructions can include first program instructions that direct processing system 620 to track and register wireless communication devices, provide paging services to wireless communication devices, authenticating wireless communication devices, store circuit switched fallback (CSFB) service enable or disable indicators, and receive CSFB enable/disable indicators transferred by wireless communication devices, among other operations.

In general, software 635 can, when loaded into processing system 620 and executed, transform processing system 620 overall from a general-purpose computing system into a special-purpose computing system customized to track and register wireless communication devices, provide paging services to wireless communication devices, authenticating wireless communication devices, store circuit switched fallback (CSFB) service enable or disable indicators, and receive CSFB enable/disable indicators transferred by wireless communication devices, among other operations. Encoding software 635 on storage system 630 can transform the physical structure of storage system 630. The specific transformation of the physical structure can depend on various factors in different implementations of this description. Examples of such factors can include, but are not limited to the technology used to implement the storage media of storage system 630 and whether the computer-storage media are characterized as primary or secondary storage. For example, if the computer-storage media are implemented as semiconductor-based memory, software 635 can transform the physical state of the semiconductor memory when the program is encoded therein. For example, software 635 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Control node 600 can also include other elements, such as user interfaces, computer systems, databases, distributed storage and processing elements, and the like. Control node 600 can be included in the equipment or systems of first wireless communication network 120 of FIG. 1 or elements 321, 322, 331, 332, 333, or 360 of FIG. 3, or can be included in separate equipment or systems, including combinations thereof.

Figure 7:
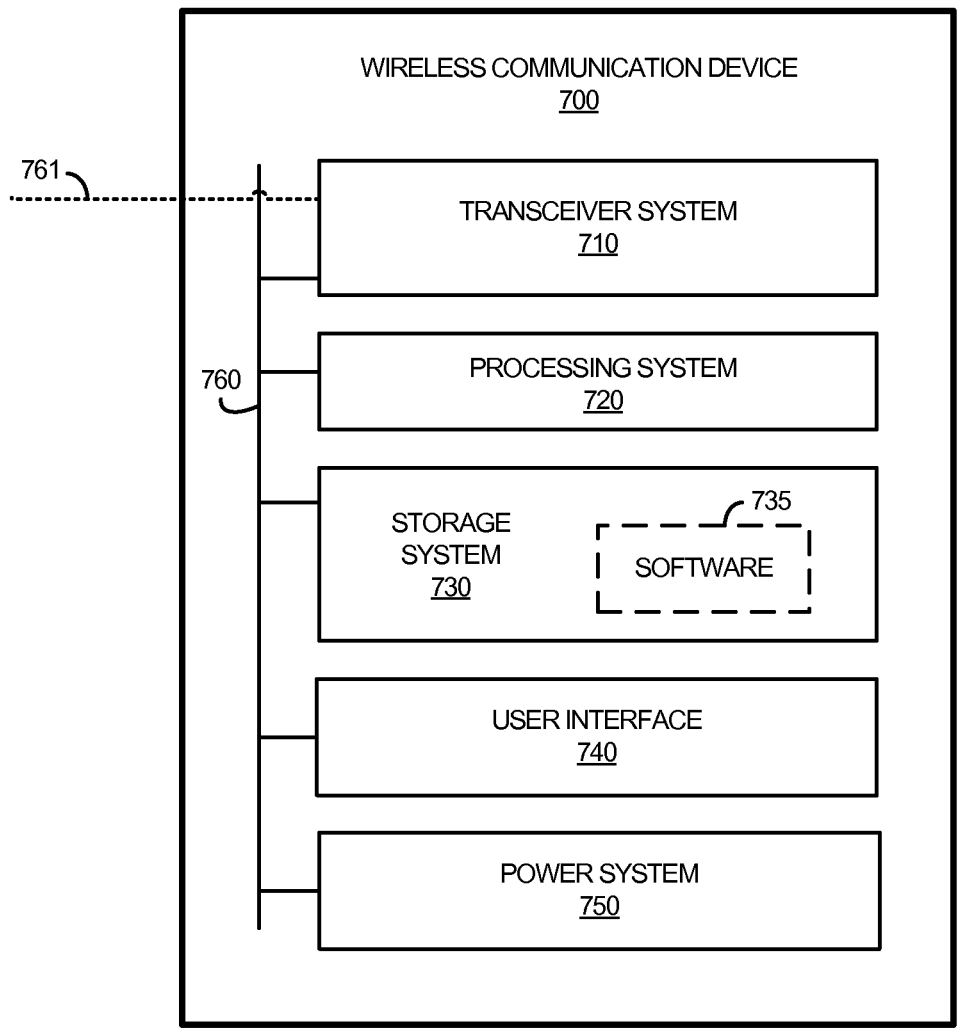
FIG. 7 is a block diagram illustrating a wireless communication device.

FIG. 7 is a block diagram illustrating wireless communication device 700, as an example of wireless communication device 110 found in FIG. 1 or user devices 310 or 370 found in FIG. 3, although variations are possible. Wireless communication device 700 includes transceiver portion 710, processing system 720, storage system 730, user interface 740, and power system 750. Transceiver portion 710, processing system 720, storage system 730, user interface 740, and power system 750 are shown to communicate over a common bus 760 for illustrative purposes. It should be understood that discrete links could be employed, such as data links, power links, RF links, or other links. Wireless communication device 700 can be distributed or consolidated among equipment or circuitry that together forms the elements of wireless communication device 700. Wireless communication device 700 can optionally include additional devices, features, or functionality not discussed here for purposes of brevity.

Transceiver portion 710 comprises one or more antenna elements and communication interface circuitry for communicating with wireless access nodes of a wireless communication network, such as with base stations of a cellular voice and data network. Transceiver portion 710 could include transceiver equipment and antenna elements for wirelessly exchanging user communications and overhead communications over the associated wireless link 761. Transceiver portion 710 also receives command and control information and instructions from processing system 720 or user interface 740 for controlling the operations of wireless communications over wireless link 761. Wireless link 761 could use various protocols or communication formats as described herein for wireless links 130, 132, 320, or 330, including combinations, variations, or improvements thereof.

Processing system 720 can comprise one or more microprocessors and other circuitry that retrieves and executes software 735 from storage system 730. Processing system 720 can be implemented within a single processing device but can also be distributed across multiple processing devices or sub-systems that cooperate in executing program instructions. Examples of processing system 720 include general purpose central processing units, application specific processors, and logic devices, as well as any other type of processing device, combinations, or variations thereof.

Storage system 730 can comprise any computer readable storage media readable by processing system 720 and capable of storing software 735. Storage system 730 can include volatile and nonvolatile, removable and non-removable media implemented in any method or technology for storage of information, such as computer readable instructions, data structures, program modules, or other data. In addition to storage media, in some implementations storage system 730 can also include communication media over which software 735 can be communicated. Storage system 730 can be implemented as a single storage device but can also be implemented across multiple storage devices or sub-systems co-located or distributed relative to each other. Storage system 730 can comprise additional elements, such as a controller, capable of communicating with processing system 720. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 735 can be implemented in program instructions and among other functions can, when executed by wireless communication device 700 in general or processing system 720 in particular, direct wireless communication device 700 or processing system 720 to communicate with wireless access nodes over wireless links, receive wireless access to communication services from wireless access nodes, receive circuit switch fallback (CSFB) services, wirelessly register with a communication network to receive a wireless data service with enabled CSFB services, wirelessly register with a wireless communication network to receive a wireless circuit switched voice service, identify a service problem with a wireless communication network, de-register from a wireless communication network, disable a CSFB configuration, and exchange voice communications over a wireless data service of a wireless communication network without using CSFB services, among other operations. Software 735 can include additional processes, programs, or components, such as operating system software, database software, or application software. Software 735 can also comprise firmware or some other form of machine-readable processing instructions executable by processing system 720.

In at least one implementation, the program instructions can include first program instructions that direct processing system 720 to communicate with wireless access nodes over wireless links, receive wireless access to communication services from wireless access nodes, receive circuit switch fallback (CSFB) services, wirelessly register with a communication network to receive a wireless data service with enabled CSFB services, wirelessly register with a wireless communication network to receive a wireless circuit switched voice service, identify a service problem with a wireless communication network, de-register from a wireless communication network, disable a CSFB configuration, and exchange voice communications over a wireless data service of a wireless communication network without using CSFB services.

In general, software 735 can, when loaded into processing system 720 and executed, transform processing system 720 overall from a general-purpose computing system into a special-purpose computing system customized to communicate with wireless access nodes over wireless links, receive wireless access to communication services from wireless access nodes, receive circuit switch fallback (CSFB) services, wirelessly register with a communication network to receive a wireless data service with enabled CSFB services, wirelessly register with a wireless communication network to receive a wireless circuit switched voice service, identify a service problem with a wireless communication network, de-register from a wireless communication network, disable a CSFB configuration, and exchange voice communications over a wireless data service of a wireless communication network without using CSFB services, among other operations. Encoding software 735 on storage system 730 can transform the physical structure of storage system 730. The specific transformation of the physical structure can depend on various factors in different implementations of this description. Examples of such factors can include, but are not limited to the technology used to implement the storage media of storage system 730 and whether the computer-storage media are characterized as primary or secondary storage. For example, if the computer-storage media are implemented as semiconductor-based memory, software 735 can transform the physical state of the semiconductor memory when the program is encoded therein. For example, software 735 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

User interface 740 includes equipment and circuitry for receiving user input and control, such as for engaging in voice calls or data sessions, among other operations. Examples of the equipment and circuitry for receiving user input and control include push buttons, touch screens, selection knobs, dials, switches, actuators, keys, keyboards, pointer devices, microphones, transducers, potentiometers, non-contact sensing circuitry, accelerometers, or other human-interface equipment. User interface 740 also includes equipment to communicate information to a user of wireless communication device 700. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

Power system 750 includes circuitry and a power source to provide power to the elements of wireless communication device 700. The power source could include a battery, solar cell, flywheel, capacitor, thermoelectric generator, chemical power source, dynamo, or other power source. In some examples, power system 750 receives power from an external source, such as a wall outlet or power adapter. Power system 750 also includes circuitry to condition, monitor, and distribute electrical power to the elements of wireless communication device 700.

Bus 760 comprises a physical, logical, or virtual communication link, capable of communicating data, control signals, and communications, along with other information. In this example, bus 760 also includes RF and power distribution elements, such as wires, circuit board traces, or other elements. In some examples, portions of bus 760 are encapsulated within the elements of transceiver portion 710, processing system 720, storage system 730, user interface 740, or power system 750, and can be a software or logical link. In other examples, bus 760 uses various communication media, such as air, space, metal, optical fiber, or some other signal propagation path, including combinations thereof. Bus 760 could be a direct link or might include various equipment, intermediate components, systems, and networks.

Referring back to FIG. 1, wireless communication device 110 comprises one or more antennas, transceiver circuitry elements, and communication elements. The transceiver circuitry typically includes amplifiers, filters, modulators, and signal processing circuitry. Wireless communication device 110 can also include user interface systems, memory devices, non-transitory computer-readable storage mediums, software, processing circuitry, or some other communication components. Wireless communication device 110 can be a user device, subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof.

First wireless communication network 120 and second wireless communication network 121 each comprises communication and control systems for providing access to communication services for user devices. First wireless communication network 120 and second wireless communication network 121 can each provide communication services including voice calls, text messages, data access, or other communication services provided over cellular or wireless communication networks. In some examples, First wireless communication network 120 includes equipment to provide wireless access to communication services within different coverage areas to user devices, route communications between content providers and user devices, and facilitate handoffs between equipment of different coverage areas, among other operations. First wireless communication network 120 and second wireless communication network 121 can also each comprise elements such as radio access network (RAN) equipment, E-UTRAN Node B equipment, eNodeB equipment, Evolved Node B equipment, Mobility Management Entity (MME) equipment, interworking functions (IWF), Home Subscriber Servers (HSS), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment.

Control node 125 comprises systems and equipment to track and register wireless communication devices, provide paging services to wireless communication devices, authenticating wireless communication devices, store circuit switched fallback (CSFB) service enable or disable indicators, and receive CSFB enable/disable indicators transferred by wireless communication devices, among other operations. Control node 125 can include communication or network interfaces, as well as computer systems, microprocessors, circuitry, or some other processing devices or software systems, and can be distributed among multiple processing devices. Examples of control node 125 can also include software such as an operating system, logs, databases, utilities, drivers, networking software, and other software stored on a computer-readable medium. Control node 125 typically includes Mobility Management Entity (MME) equipment. In further examples, control node 125 can include the functionality of, or combined functionality with, gateways, home subscriber server (HSS) equipment, Call Session Control Function (CSCF) equipment, session initiation protocol (SIP) proxy systems, SIP routing systems, SIP monitoring systems, mobile switching centers (MSC), radio access network (RAN) equipment, E-UTRAN equipment, interworking functions (IWF), cloud-based systems, database systems, or other systems.

Communication links 133-134 each use metal, glass, optical, air, space, or some other material as the transport media. Communication links 133-134 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 133-134 can each be a direct link or can include intermediate networks, systems, or devices, and can include a logical network link transported over multiple physical links.

Wireless links 130-132 can each use the air or space as the transport media. Wireless links 130-132 each comprises one or more wireless communication links provided over an associated wireless frequency spectrum or wireless frequency band, and can use various protocols. In this example, wireless link 130 can comprise a Long Term Evolution (LTE) or LTE Advanced wireless link, including combinations, improvements, or variations thereof. Also in this example, wireless link 132 can comprise a non-LTE wireless link such as Code Division Multiple Access (CDMA), Evolution-Data Optimized (EVDO), single-carrier radio transmission technology link (1xRTT), Global System for Mobile Communication (GSM), Universal Mobile Telecommunications System (UMTS), High Speed Packet Access (HSPA), Radio Link Protocol (RLP), 3rd Generation Partnership Project (3GPP) Worldwide Interoperability for Microwave Access (WiMAX), Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, improvements, or variations thereof.

Although one main wireless link for each of wireless links 130-132 is shown in FIG. 1, it should be understood that wireless links 130-132 are merely illustrative to show communication modes or wireless access pathways for wireless communication device 110. In other examples, further wireless links can be shown, with portions of the further wireless links shared and used for different communication sessions or different content types, among other configurations.

Communication links 130-134 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication device that is initially configured to use circuit switch fallback (CSFB) services over a first wireless communication network, the method comprising:
   wirelessly registering with the first communication network to receive a wireless data service;
   after the registration with the first communication network and responsive to an enabled CSFB configuration, wirelessly registering with a second wireless communication network to receive a wireless circuit switched voice service;
   identifying a service problem with the second wireless communication network, and in response, de-registering from the first wireless communication network and disabling the CSFB configuration;
   after disabling the CSFB configuration, re-registering with the first wireless communication network to receive the wireless data service;
   after the re-registration with the first wireless communication network, exchanging voice communications over the wireless data service of the first wireless communication network without using the CSFB services; and
   monitoring a service timer and responsive to the service timer expiring and to service quality of the second communication network exceeding a quality threshold, enabling the CSFB configuration with the first communication network.

2. The method of claim 1, wherein the first communication network comprises a Long Term Evolution (LTE) communication network, the first data service comprises an LTE data service, and the second communication network comprises one of a Code Division Multiple Access (CDMA) communication network and a Universal Mobile Telecommunications System (UMTS) communication network.

3. The method of claim 1, wherein the service problem with the second wireless communication network comprises one or more failed voice calls over the wireless circuit switched voice service of the second wireless communication network.

4. The method of claim 1, wherein the service problem with the second wireless communication network comprises unavailability of the second wireless communication network.

5. The method of claim 1, wherein exchanging the voice communications over the wireless data service of the first wireless communication network without using the CSFB services comprises exchanging the voice communications using a voice over packet (VoP) user application on the wireless communication device.

6. The method of claim 5, wherein exchanging the voice communications using the VoP user application comprises testing a voice quality check using the wireless data service and exchanging voice communications using the VoP user application when the voice quality check indicates a voice quality exceeding a voice quality threshold.

7. The method of claim 5, wherein the VoP user application comprises a voice over Internet protocol (VoIP) application.

8. The method of claim 1, further comprising:
after the service timer expiring and the service quality of the second communication network exceeding a quality threshold, and responsive to a handoff process within the first wireless communication network, enabling the CSFB configuration with the first communication network.

9. The method of claim 1, wherein disabling the CSFB configuration comprises transferring signaling to a Mobility Management Entity (MME) of the first wireless communication network that indicates a disabled CSFB configuration for the wireless communication device.

10. A wireless communication device that is initially configured to use circuit switch fallback (CSFB) services over a first wireless communication network, the wireless communication device comprising:
a transceiver portion configured to wirelessly register with the first communication network to receive a wireless data service;
after the registration with the first communication network and responsive to an enabled CSFB configuration, the transceiver portion configured to wirelessly register with a second wireless communication network to receive a wireless circuit switched voice service;
a processing system configured to identify a service problem with the second wireless communication network, and in response, de-register from the first wireless communication network and disable the CSFB configuration;
after disabling the CSFB configuration, the transceiver portion configured to re-register with the first wireless communication network to receive the wireless data service;
after the re-registration with the first wireless communication network, the transceiver portion configured to exchange voice communications over the wireless data service of the first wireless communication network without using the CSFB services; and
the processing system configured to monitor a service timer and responsive to the service timer expiring and to service quality of the second communication network exceeding a quality threshold, enable the CSFB configuration with the first communication network.

11. The wireless communication device of claim 10, wherein the first communication network comprises a Long Term Evolution (LTE) communication network, the first data service comprises an LTE data service, and the second communication network comprises one of a Code Division Multiple Access (CDMA) communication network and a Universal Mobile Telecommunications System (UMTS) communication network.

12. The wireless communication device of claim 10, wherein the service problem with the second wireless communication network comprises one or more failed voice calls over the wireless circuit switched voice service of the second wireless communication network.

13. The wireless communication device of claim 10, wherein the service problem with the second wireless communication network comprises unavailability of the second wireless communication network.

14. The wireless communication device of claim 10, comprising:
the transceiver portion configured to exchange the voice communications using a voice over packet (VoP) user application on the wireless communication device to exchange the voice communications over the wireless data service of the first wireless communication network without using the CSFB services.

15. The wireless communication device of claim 14, comprising:
the processing system configured to test a voice quality check using the VoP user application and the wireless data service; and
the voice transceiver portion configured to exchange voice communications using the VoP user application when the voice quality check indicates a voice quality exceeding a voice quality threshold.

16. The wireless communication device of claim 14, wherein the VoP user application comprises a voice over Internet protocol (VoIP) application.

17. The wireless communication device of claim 10, further comprising:
after the service timer expiring and the service quality of the second communication network exceeding the quality threshold, and responsive to a handoff process within the first wireless communication network, the processing system configured to enable the CSFB configuration with the first communication network.

18. The wireless communication device of claim 10, comprising:
in response to identifying the service problem, the transceiver portion configured to transfer signaling to a Mobility Management Entity (MME) of the first wireless communication network that indicates a disabled CSFB configuration for the wireless communication device.

* * * * *